Patented June 23, 1953

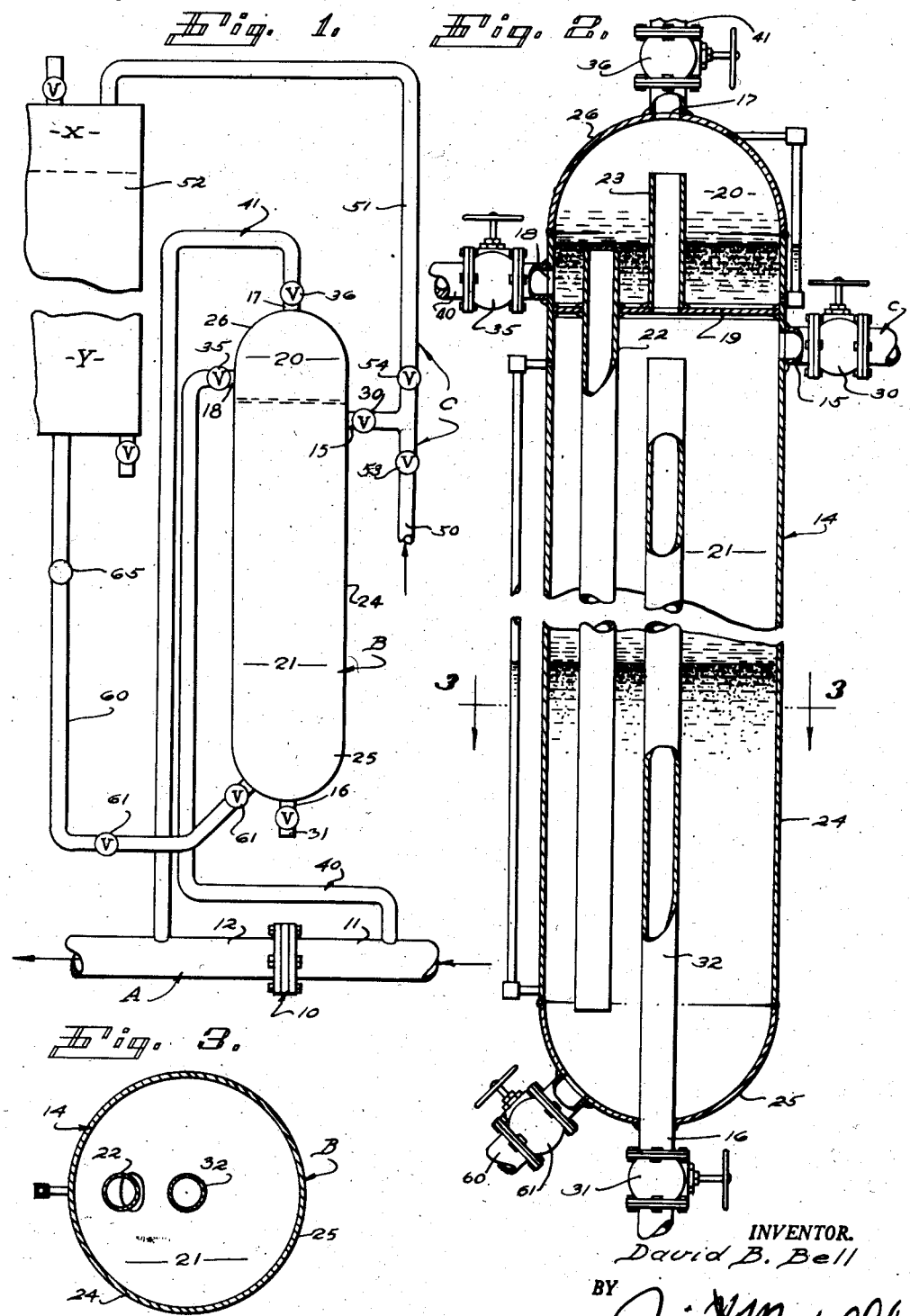

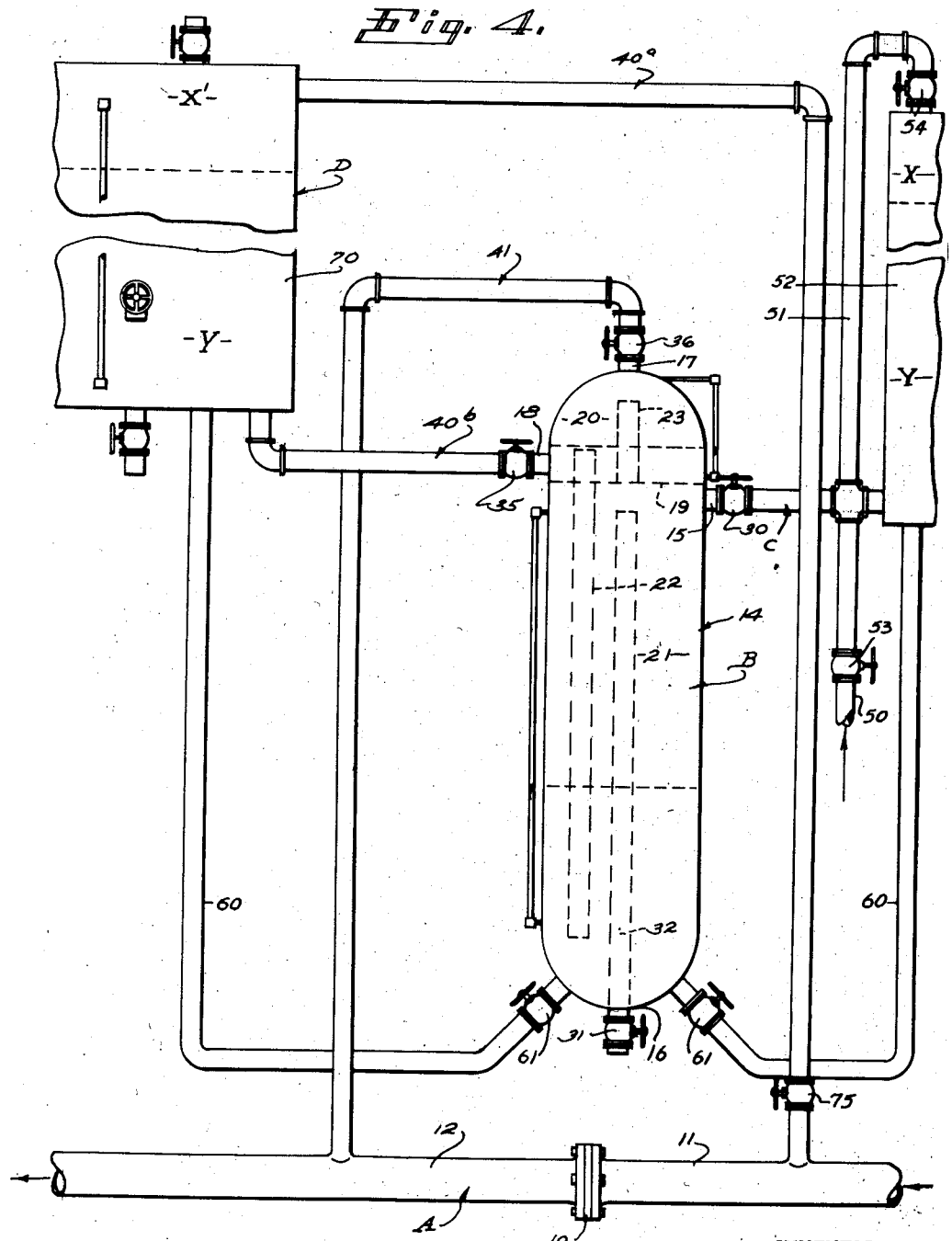

2,642,886

UNITED STATES PATENT OFFICE 2,642,886

LIQUID FEEDING APPARATUS

David B. Bell, Long Beach, Calif.

Application August 1, 1949, Serial No. 107,842

5 Claims. (Cl. 137—98)

This invention is concerned with fluid handling or feeding apparatus and it is a general object of the invention to provide apparatus in which a liquid feed is related to a flow line and is operated by liquid from the flow line to feed or deliver a second liquid to the flow line. It is a general object of the invention to provide apparatus of the general character referred to combining a liquid feed and flow line in a practical and advantageous manner, and which may include a replenishing means for supplying the liquid being fed, and may further include means separating the liquid taken from the line as an actuating medium from the liquid being fed, the latter being advantageous in situations where the liquid in the line employed as the actuating medium is such as to readily commingle with the liquid being fed.

There are various situations where a liquid is being handled by a flow line and it is desired to treat or add to such liquid a second liquid in a predetermined manner or in predetermined quantities. In most such situations it is desirable that the liquid fed into the flow line be fed at a predetermined rate relative to the flow in the said line and in some cases the liquid in the flow line is of the same general character or nature as the liquid to be fed, or in other words, is such as to readily commingle therewith.

The present invention is intended for use in situations of the general character referred to and it involves, essentially, a liquid feed combined with a flow line and actuated by liquid taken from the flow line to deliver a second liquid to the flow line. In a typical application the liquid feed involves a closed vessel with a feed chamber and a storage chamber. Filling connections are provided for introducing liquids into the vessel, an outlet is provided to pass the fed liquid from the vessel, an inlet is provided to admit the actuating liquid to the vessel, preferably to the feed chamber, a bleed duct is provided to conduct actuating liquid from the feed chamber to the storage chamber, and a make-up duct conducts the liquid to be fed from the storage chamber to the feed chamber. A flow control is preferably incorporated in the flow line dividing the line into a high pressure upstream section and a low pressure downstream section. A pressure line extends from the upstream high pressure section to the inlet of the vessel, and a delivery line extends from the outlet of the vessel to the downstream side of the flow line.

In addition to the essential elements referred to the invention provides supply means acting to provide a supply of the liquid to be fed to the closed vessel and the supply means may, broadly, involve merely a supply line delivering the liquid to be fed or it may involve a reservoir carrying a body of such liquid and connections from the reservoir to the vessel whereby such liquid may be delivered to the vessel as desired.

Further, the invention may be carried out by providing liquid separating means which acts between or to separate the actuating liquid taken from the flow line from the liquid that is fed to the flow line. In accordance with the invention the separating means embodies or involves a body of liquid that will not commingle either with the actuating liquid or the fed liquid and in the form of the invention illustrated the separating means involves a cell interposed in the pressure line, so that actuating liquid from the flow line enters the cell and displaces the said other or third liquid from the cell to the vessel to operate therein and effect the desired feed of the liquid fed to the flow line.

A general object of the present invention is to provide apparatus of the general character referred to which is simple and inexpensive of manufacture, accurate and dependable in operation, and free of delicate or complicated mechanical features such as floats, regulating valves, etc.

A further object of the invention is to provide apparatus of the general character referred to which, with limited modification or variation, may be adapted to a wide range of operating conditions, as for instance, for handling a wide range or variety of liquids. The apparatus of the present invention is effective in handling liquids which remain separated or which do not commingle when brought together and it may likewise be employed to advantage in handling liquids which are so like in character as to readily mix or commingle when brought together.

The various objects and features of my invention will be fully understood from the following detailed description of typical preferred forms and applications of the invention, throughout which description reference is made to the accompanying drawings, in which:

Fig. 1 is a diagrammatic view illustrating a simple form and application of the present invention in which the liquid feed is combined with a flow line and in which a supply means is connected with the liquid feed and involves a supply pipe from a remote source of supply, and a liquid reservoir which may be located in any suitable position relative to the liquid feed. Fig. 2 is an enlarged vertical detailed sectional view of the liquid feed as shown in Fig. 1 of the drawings. Fig. 3 is a plan section taken as indicated by line 3—3 on Fig. 2, and Fig. 4 is a diagrammatic view similar to Fig. 1 showing elements such as are illustrated in Fig. 1 further combined with liquid separating means useful where the actuating fluid from the supply line is such as to commingle with the liquid to be fed when brought in contact therewith.

Referring first to the form of the invention illustrated in Figs. 1 to 3 of the drawings the apparatus involves, generally, a flow line A, a liquid feed B and a supply means C.

The flow line A is shown equipped with a typical simple liquid control 10 such as an orifice fitting, which control fitting serves to separate the line A into an upstream high pressure section 11 and a downstream low pressure section 12. It is to be understood that a suitable flow of liquid occurs in the flow line A and in accordance with the present invention this flow may vary without disturbing the action of the present invention.

The liquid feed B shown in the drawings is of the general form or type which is more fully set forth and which is specifically claimed, per se, in my copending application entitled Fluid Feeding Apparatus, Serial No. 107,841, filed on August 1, 1949. As shown in Fig. 2 of the drawings the liquid feed B involves, generally, a closed body or vessel 14, one or more filling connections such as connections 15 and 16 through which liquid may be introduced into the vessel, an outlet 17 through which fluid to be fed is passed from the vessel, an inlet 18 through which operating or actuating liquid is introduced into the vessel, a partition 19 in the vessel separating it into a feed compartment or chamber 20 and a storage compartment or chamber 21, a bleed duct 22 acting to conduct actuating fluid from the feed chamber to the storage chamber and a make-up duct 23 passing fluid to be fed from the storage chamber to the feed chamber.

In the preferred form of the invention the vessel 14 has a vertically disposed cylindrical body 24, a lower end 25 closing the lower end of the body 24, and an upper end 26 closing the upper end of the body 24. The partition 19 is a simple wall or member arranged horizontally or transversely in the body 24 at a suitable point, preferably in the upper end portion of the vessel so that the feed chamber in this case shown at the upper end of the vessel is of limited capacity, while the storage chamber occupying the vessel below the partition is of substantial capacity.

The filling connections preferably serve to admit liquids into the vessel to charge or fill it and they may be employed from time to time to replenish the liquid fed from the vessel as the apparatus operates. In the preferred arrangement the filling connection 15 is under control of a valve 30 and admits liquid into the vessel B at the upper end of the storage chamber 21. The filling connection 16 is under control of a valve 31 and is shown as provided with an extension 32 within the vessel opening in the upper end portion of storage chamber 21.

The inlet 18 to the vessel 14 is preferably such as to admit actuating liquid into the bottom or lower end portion of the feed chamber 20 and in the drawings it is shown under control of a suitable valve 35. The outlet 17 is provided to pass the fed fluid from the feed chamber 20 and is shown under control of a valve 36.

The bleed duct 22 may be a simple open-ended vertically disposed tubular member extending through the partition 19 and having its upper end open at a suitable level in the feed chamber 20 and its lower end open into the lower end portion of the storage chamber 21. The bleed duct 22 serves to, in effect, allow overflow of actuating liquid from the feed chamber 20 into the storage chamber 21 and it acts to maintain a given quantity of actuating liquid in the chamber 20 while a predetermined quantity or body of liquid to be fed is maintained in the chamber 20 above the actuating liquid.

By reason of the bleed duct 22 the aforementioned relationship of liquids is maintained in the feed chamber 20 and the apparatus thus operates against a constant head of fluid to be fed from chamber 20.

The makeup duct 23 provides connection between the storage chamber 21 and the feed chamber 20 and as shown in the drawings its lower end opens through the partition 19 to receive liquid from the storage chamber 21 while its upper end opens in the chamber 20 at a point above the upper end of the bleed duct and delivers liquid to be fed into the chamber 20.

In accordance with the present invention a pressure line 40 extends from the upstream section 11 of the flow line to the inlet 18 so that actuating liquid from the flow line is admitted to the feed chamber 20 through the valve 35, thus putting the liquid in the vessel under the pressure that prevails in the upstream side or section of the flow line.

A delivery line 41 extends from the outlet 17 to the downstream section 12 of the flow line A and as liquid to be fed is displaced from the feed chamber 20 by actuating liquid entering the chamber 20 it is conducted through the delivery line 40 to the flow line A.

The supply means C, as shown in the drawings, may involve a supply line 50 from any suitable source of supply of liquid to be fed or a supply line 51 from a reservoir 52, or both. In the case illustrated the two supply lines 50 and 51 are connected with the vessel through the filling connection 15 to be under control of valve 30 and they are under control of valves 53 and 54, respectively, so that either the supply line 50 or the supply line 51 may be employed as circumstances require.

The reservoir 52 may be provided in any suitable location relative to the liquid feed B and in its preferred form it carries a body X of liquid to be supplied to the liquid feed as liquid to be fed therefrom and a body Y of liquid, corresponding to that delivered to the liquid feed, as actuating liquid. For purpose of example the liquid X to be fed may be considered as oil, and the liquid Y employed as actuating liquid may be considered as water. Since oil and water do not mix these two liquids may be carried in the reservoir 52 as illustrated in the drawings, in which case the oil floats on the water and the supply line 51 is connected into the top of the reservoir 52 to conduct the oil therefrom and into the feed B.

A transfer connection 60 is provided between the lower end portion of the storage chamber 21 of the liquid feed B and the lower end portion of the reservoir 52 and is under control of one or more valves 61. Through the transfer connection when oil is to be supplied to the liquid feed B from the reservoir 52 the valve 30 is opened and the valve or valves 61 are opened and as water is displaced from the bottom of the storage reservoir 21 oil is introduced into the upper end of storage chamber 21. In practice any suitable means such as a simple pump 65 may be provided to effect the desired circulation of liquids as just described. When the desired quantity of liquid to be fed is contained in the chamber 21 valves 30 and 61 are closed. It will be recognized that if desired and through suitable setting or cracking of the valves a substantially constant supply of liquid to be fed may be delivered to the liquid feed B so that the body of liquid to be fed in the chamber 21 is constantly maintained.

In the form of the invention illustrated in Fig. 4 the various elements of the liquid feed B, the flow line A, and the supply means C may be substantially as above described, all of which will be apparent from a consideration of the drawings. The form of the invention illustrated in Fig. 4 is intended to be used where the liquid handled by the flow line A is of such character as to readily mix or commingle with the liquid to be fed. Such a situation may arise where two oils are to be handled and are of such character that they do not remain separated when brought together. In accordance with the present invention the liquid separating means D illustrated in Fig. 4 of the drawings introduces a third liquid into the apparatus, which third liquid serves as a medium acting between the actuating liquid taken from the line A and the liquid which is to be fed into the line A.

In the form of the invention illustrated the separating means D involves, generally, a seal which may be in the nature of a tank 70 interposed in the pressure line between the flow line section 11 and the inlet 18 of the liquid feed B so that the pressure line has a flow line section 40ª extending from the flow line 11 to the tank 70 and a feed section 40ᵇ extending from the tank 70 to the feed B. In the case of the example above referred to a body of water Y is provided in the lower portion of tank 70 while a body of oil X' is carried in the tank 70 above the water Y being supplied to the tank 70 from the flow line section 11 through the pressure line section 40ª. The water from the body of water Y in tank 70 is conducted by the pressure connection section 40ᵇ to the inlet 18 of the feed B to there act upon or with the liquid or oil to be fed to the flow line section 12. Assuming the liquid to be fed to be oil the water introduced into the feed B through the connection 40ᵇ does not commingle with the oil to be fed but remains separated therefrom in the manner illustrated in Fig. 2. It is to be understood, of course, that the vessel or tank D is a closed vessel, preferably maintained full of water and oil so that the pressure of the upstream high pressure side of the flow line is communicated therethrough and to the feed chamber 20 of the feed B.

It will be apparent from the foregoing that by the construction shown in Fig. 4 it is possible to transfer a first liquid X, such as a particular type of oil capable of commingling with the liquid X' flowing through the line A from the tank 52, into the feed B to be fed therefrom into the flow line section 12. The liquid X is fed to the apparatus B in response to the pressure head of the second or actuating liquid Y, such as water, these liquids being contained within the reservoir 52. This operation is carried out in a manner similar to that explained in connection with the apparatus disposed in Figs. 1 to 3, that is, by forcing the water Y from the tank D into the feed B under pressure to feed the liquid X through the line 41.

Following the feeding of a predetermined amount of the liquid X from the feed B into the low pressure section 12, liquid Y is fed into the section 12 to serve as a separator between the liquid X and the liquid X' normally flowing through the line A. This introduction of the water Y is effected by simply closing the valve 30 or the valves 53 and 54, the fluid pressure in line 40ª then acting against the head X' in the tank D to force the liquid Y through the feed B and into the flow line section 12. Following this step, a valve 75 in the pressure line 40ª is closed to temporarily discontinue operation of the liquid feeding apparatus so as to bring about full flow of the liquid X' through the sections 11 and 12.

After a predetermined flow of the liquid X', the valve 75 is re-opened to establish pressure flow of the water Y from the tank D, through the feed B, into the section 12. Following this step, the valves 30, 53 and 54 are again opened to cause another quantity of the liquid X to be fed into the section 12. These sequential steps are repeated so long as the two immiscible liquids X and X' are to be fed through the section 12, separated by a wall or buffer of the liquid Y.

It is to be understood that in carrying out the present invention various liquid level gages, pressure gages and other accessories may be provided in or in connection with the various elements of the apparatus, as circumstances may require.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a flow line with a high pressure section and a low pressure section, a liquid feed including, a feed chamber, a storage chamber, an inlet to the feed chamber, an outlet from the feed chamber, a bleed duct from the feed chamber to the storage chamber, and a make-up duct from the storage chamber to the feed chamber, liquid supply means including a valve controlled supply line supplying liquid to the liquid feed, a pressure line connected to the inlet and adapted to connect to the high pressure section of the flow line, a delivery line connected to the outlet and adapted to connect to the low pressure section of the flow line, and means for maintaining liquid from the flow line out of contact with the liquid to be fed, said means being disposed in the pressure line.

2. Apparatus for use with a flow line having a high pressure section and a low pressure section including a liquid feed including, a feed chamber, a storage chamber, an inlet to the feed chamber, an outlet from the feed chamber, a bleed duct from the feed chamber to the storage chamber, and a make-up duct from the storage chamber to the feed chamber, liquid supply means including a reservoir carrying liquid to be fed and a supply line delivering liquid from the reservoir to the liquid feed, a pressure line connected to the inlet and adapted to connect to the high pressure section of the flow line, a delivery line connected to the outlet and adapted to connect to the low pressure section of the flow line, and means for maintaining liquid from the flow line out of contact with the liquid to be fed, said means being disposed in the pressure line.

3. In combination, a flow line handling a stream of liquid and having a high pressure section and a low pressure section, a liquid feed including a feed chamber carrying liquid to be fed, a storage chamber carrying liquid to be fed, an inlet to the feed chamber, an outlet from the feed chamber, a bleed from the feed chamber to the storage chamber, a make-up duct from the storage chamber to the feed chamber, a pressure line connected to the inlet and adapted to connect to the high pressure section of the flow line, a delivery line connected to the outlet and adapted to connect to the low pressure section of the flow line, and means for maintaining liquid from the flow line out of contact with the liquid to be fed including a cell carrying a liquid differing from the liquid carried by the flow line and from the liquid to be fed, said means being located in said pressure line.

4. In combination, a flow line handling a stream of liquid and having a high pressure section and a low pressure section, a liquid feed including a feed chamber carrying liquid to be fed, a storage chamber carrying liquid to be fed, an inlet to the feed chamber, an outlet from the feed chamber, a bleed duct from the feed chamber to the storage chamber, a make-up duct from the storage chamber to the feed chamber, a pressure line connected to the inlet and adapted to connect to the high pressure section of the flow line, a delivery line connected to the outlet and adapted to connect to the low pressure section of the flow line, and means for maintaining liquid from the flow line out of contact with the liquid to be fed including a cell carrying a liquid differing from the liquid carried by the flow line and from the liquid to be fed, the cell dividing the pressure line so that it has a section conducting liquid from the high pressure section of the flow line to the cell and a section conducting said differing liquid from the cell to the inlet of the liquid feed to enter the feed chamber and overflow therefrom to the storage chamber.

5. In combination, a flow line handling a stream of liquid and having a high pressure section and a low pressure section, a liquid feed including a feed chamber carrying liquid to be fed, a storage chamber carrying liquid to be fed, an inlet to the feed chamber, an outlet from the feed chamber, a bleed duct from the feed chamber to the storage chamber, a make-up duct from the storage chamber to the feed chamber, a pressure line connected to the inlet and adapted to connect to the high pressure section of the flow line, a delivery line connected to the outlet and adapted to connect to the low pressure section of the flow line, and means for maintaining liquid from the flow line out of contact with the liquid to be fed, said means being disposed in the pressure line.

DAVID B. BELL.

References Cited in the file of this patent

UNITED STATES PATENTS

| Number | Name | Date |
|---|---|---|
| 916,130 | Evans | Mar. 23, 1909 |
| 916,132 | Evans | Mar. 23, 1909 |
| 1,085,348 | Ledoux | Jan. 27, 1914 |
| 1,735,441 | Paffen et al. | Nov. 12, 1929 |
| 2,175,526 | Hutchison et al. | Oct. 10, 1939 |
| 2,212,374 | Louis | Aug. 20, 1940 |
| 2,219,763 | Cartier | Oct. 29, 1940 |
| 2,323,341 | McGill | July 6, 1943 |